US010823156B2

(12) United States Patent
Christensen et al.

(10) Patent No.: US 10,823,156 B2
(45) Date of Patent: Nov. 3, 2020

(54) SEGMENTED PITCH RING FOR A WIND TURBINE BLADE PITCH SYSTEM

(71) Applicant: Vestas Wind Systems A/S, Aarhus N. (DK)

(72) Inventors: Michael Christensen, Hinnerup (DK); Simon Kabus, Viborg (DK); Erik Markussen, Videbæk (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 182 days.

(21) Appl. No.: 15/737,961

(22) PCT Filed: Jun. 8, 2016

(86) PCT No.: PCT/DK2016/050168
§ 371 (c)(1),
(2) Date: Dec. 19, 2017

(87) PCT Pub. No.: WO2017/005264
PCT Pub. Date: Jan. 12, 2017

(65) Prior Publication Data
US 2018/0156203 A1    Jun. 7, 2018

(30) Foreign Application Priority Data

Jul. 6, 2015  (DK) .................................. 2015 70445

(51) Int. Cl.
*F03D 80/70* (2016.01)
*F03D 7/02* (2006.01)
(Continued)

(52) U.S. Cl.
CPC ........... *F03D 80/70* (2016.05); *F03D 1/0658* (2013.01); *F03D 7/0224* (2013.01); *F16C 33/60* (2013.01);
(Continued)

(58) Field of Classification Search
CPC ...... F03D 80/70; F03D 1/0658; F03D 7/0224; F05B 2230/21; F05B 2230/26;
(Continued)

(56) References Cited

U.S. PATENT DOCUMENTS 4,126,361 A  *  11/1978  Bottner ................... E02F 9/121
                                                        384/455
9,523,348 B2 *  12/2016  Jacobsen ............... F03D 1/0633
(Continued)

FOREIGN PATENT DOCUMENTS

CN            101275535 A       10/2008
CN            102840097 A       12/2012
(Continued)

OTHER PUBLICATIONS

"The Advantages of Steel Castings". Liaoning Borui Machinery Co., Ltd. Aug. 2011 [retribed on Jan. 23, 2020]. Retrieved from the Internet: <http://www.iron-foundry.com/steel-castings-advantages.html>. (Year: 2011).*
(Continued)

*Primary Examiner* — Nathaniel E Wiehe
*Assistant Examiner* — Jackson N Gillenwaters
(74) *Attorney, Agent, or Firm* — Wood Herron & Evans LLP

(57) ABSTRACT

The present invention provides a segmented pitch ring for use in a blade pitch system of a wind turbine. The segmented pitch ring is formed of a plurality of segments manufactured by different processes. In particular, one or more of the segments are formed by a rolling process, and one or more of the segments are formed by a casting process. The segments are arc-shaped or include arc-shaped sections that in combination define a substantially circular circumference of the pitch ring.

16 Claims, 8 Drawing Sheets

(51) Int. Cl.
*F03D 1/06* (2006.01)
*F16C 33/60* (2006.01)

(52) U.S. Cl.
CPC ....... *F05B 2230/21* (2013.01); *F05B 2230/26* (2013.01); *F05B 2240/50* (2013.01); *F05B 2260/79* (2013.01); *F16C 2360/31* (2013.01); *Y02E 10/72* (2013.01); *Y02P 70/50* (2015.11)

(58) Field of Classification Search
CPC .... F05B 2260/79; B22D 19/00; B23P 15/003; B63H 3/00
See application file for complete search history.

(56) References Cited

U.S. PATENT DOCUMENTS

| | | | |
|---|---|---|---|
| 9,541,133 B2 * | 1/2017 | Noirot | F03D 7/0224 |
| 2011/0311362 A1 * | 12/2011 | Corts | F16C 33/60 |
| | | | 416/174 |
| 2012/0134806 A1 | 5/2012 | Andersen et al. | |
| 2013/0259688 A1 | 10/2013 | Sorensen | |
| 2014/0003946 A1 * | 1/2014 | Moore | F03D 80/00 |
| | | | 416/174 |
| 2014/0064971 A1 | 3/2014 | Sivanantham et al. | |
| 2015/0003986 A1 | 1/2015 | Minadeo et al. | |
| 2016/0312766 A1 * | 10/2016 | Rasmussen | F03D 7/0224 |

FOREIGN PATENT DOCUMENTS

| | | |
|---|---|---|
| EP | 2458200 A1 | 5/2012 |
| EP | 2458209 A2 | 5/2012 |
| EP | 2546512 A1 | 1/2013 |
| EP | 2679805 A1 | 1/2014 |
| EP | 2722559 A2 | 4/2014 |
| WO | 2012069062 A1 | 5/2012 |
| WO | WO-2012069062 A1 * | 5/2012 ........... F03D 1/0691 |

OTHER PUBLICATIONS

China National Intellectual Property Administration, First Notification of Office Action in CN Application No. 201680040126.9, dated Dec. 4, 2018.
European Patent Office, Examination Report in EP Application No. 16727946.2, dated Feb. 14, 2019.
Danish Patent and Trademark Office, Search Report in PA 2015 70445, dated Jan. 27, 2016.
European Patent Office, International Search Report and Written Opinion in PCT Application No. PCT/DK2016/050168, dated Aug. 29, 2016.

* cited by examiner

SEGMENTED PITCH RING FOR A WIND TURBINE BLADE PITCH SYSTEM

TECHNICAL FIELD

The present invention relates generally to wind turbines and more specifically to a pitch ring for use in a blade pitch system of a wind turbine. The invention also relates to a method of making a pitch ring.

BACKGROUND

Wind turbines typically include a rotor with large blades driven by the wind. The blades convert the kinetic energy of the wind into rotational mechanical energy. Typically, the mechanical energy is transferred via a drive train to a generator, which then converts the energy into electrical power.

Most modern wind turbines control power output by pitching the blades relative to the wind. Thus, each blade is mounted to a hub by a pitch system that allows relative movement between the blade and the hub. The pitch system comprises a pitch bearing, which typically includes concentrically-arranged inner and outer bearing rings. One of the bearing rings (either the inner or the outer ring) is attached to the blade and the other is attached to the hub.

The pitch system also includes a drive system comprising one or more pitch drive devices such as electric motors or hydraulic actuator. The drive devices are used to turn the bearing ring attached to the blade relative to the bearing ring attached to the hub in order to adjust the pitch of the blade, i.e. to turn the blade about its longitudinal axis.

An example of a pitch system for a wind turbine blade is described in the applicant's prior PCT application WO 2012/069062. FIG. 1 shows an exploded perspective view of the prior art pitch system described in WO 2012/069062. Referring to FIG. 1, the pitch system 20 includes a bearing 22, first and second coupling members 24, 26, and a drive system 28. More specifically, the bearing 22 includes an inner bearing ring 30 mounted to the hub 6 and an outer bearing ring 32 mounted to the blade. The first coupling member 24 is positioned between the hub 6 and the inner bearing ring 30. The second coupling member 26 is positioned between the blade and outer bearing ring 32. The drive system 28 comprises hydraulic actuators 34, which are connected to the first and second coupling members 24, 26 so that the drive system 28 can rotate the inner bearing ring 30 relative to the outer bearing ring 32 and thereby pitch the blade relative to the hub 6.

The first and second coupling members 24, 26 shown in FIG. 1 each comprise a pitch ring for attaching to a respective bearing ring 30, 32. The first coupling member 24 further includes a plate, whilst the second coupling member 26 includes a cross-beam. The plate and cross-beam of the respective coupling members 24, 26 provide mounting points for the hydraulic actuators 34. In addition to providing mounting points for the actuators 34, one or both of the coupling members 24, 26 may be designed to alleviate loads in the bearing rings 30, 32, for example to ensure that loads are distributed evenly around the circumferences of the bearing rings 30, 32. This prevents uneven wearing of the bearing rings 30, 32 and extends the service life of the pitch bearing 22.

Over time there has been a significant increase in the overall size of wind turbine blades because of the desire to capture more of the wind's available energy. For instance, the root diameter of existing utility-scale wind turbine blades is in excess of 4.5 metres. This necessitates pitch system components, such as bearing rings, of similar size. The sizes of pitch system components are set to increase further in the future as blade sizes become ever larger.

Many of the components of a pitch system, for example the pitch rings comprising the coupling elements 24, 26, are formed by casting. Typically the pitch rings are cast as a single piece from steel. However, as the diameters of such pitch rings become very large, it becomes increasingly-more challenging and costly to form them as a single casting.

One aim of the present invention is to address the problems outlined above to provide a component for a pitch system that is easier and less expensive to manufacture and which improves the structural integrity of the arrangement.

SUMMARY OF THE INVENTION

According to an aspect of the present invention there is provided a segmented pitch ring for use in a blade pitch system of a wind turbine. The segmented pitch ring comprises one or more rolled segments and one or more casted segments. The rolled and casted segments are arc-shaped or comprise arc-shaped sections that in combination define a substantially circular circumference of the pitch ring. The casted segments are manufactured by a casting process and the rolled segments are manufactured by a rolling process.

Current blade pitch rings are typically casted as a single part or piece, and it becomes problematic for blade pitch rings of ever larger diameter to be casted in this way because of the significant amount of empty space in the ring centre and because of reduced structural integrity. The present invention is advantageous in that the blade pitch ring is formed of a plurality of (smaller) segments, which are easier to manufacture, particularly for utility-scale wind turbines.

In a preferred embodiment, the pitch ring comprises a plurality of rolled segments and a plurality of casted segments. In this embodiment, the rolled segments are arranged alternately with the casted segments to define the circumference of the pitch ring.

One or more of the rolled segments may be formed by a cold-rolling process. By 'cold rolling' is meant that the manufacturing process takes place below the recrystallization temperature of the material to be rolled. For example, the recrystallization temperature of steel may be between around 400° C. and 700° C. Typically, however, the cold-rolling process may take place at around room temperature. The uniformity of the desired shape and dimensions of the one or more segments to be rolled make these segments suitable to be manufactured by cold rolling.

The one or more rolled segments may form a greater portion of the circumference of the pitch ring than the one or more casted segments. The rolling manufacturing process is simpler and more cost effective than the equivalent casting process. Therefore, it is advantageous to manufacture a greater proportion of the circumference of the pitch ring using rolled segments, and particularly advantageous to maximise the proportion of the pitch ring formed by rolled segments.

It is advantageous, however, to form at least part of the segmented blade pitch ring by casting. Although a blade pitch ring may be generally circular, it typically includes sections of a more complex shape, for example having integrally-formed features for connection or attachment to other components of the pitch system. These complex-shaped parts are less suitable to be formed by rolling and so it is convenient to form these parts by casting. Therefore, by using a combination of rolled and casted segments, the present invention minimises the weight and cost of a blade pitch ring while increasing the ease of manufacture.

The pitch ring may have any suitable number of rolled and casted segments. In preferred embodiments, the one or more rolled segments have a greater circumferential length than the one or more casted segments. This advantageously allows the proportion of the pitch ring formed by rolled components to be maximised whilst at the same time minimising the number of rolled sections required, thus simplifying the manufacturing and assembly process of the pitch ring, and providing a cost-effective solution. It is conceivable, however, that the rolled segments may each have a shorter circumferential length than the casted segments yet still, in combination, form a greater portion of circumference of the pitch ring than the casted segments. Such embodiments would require relatively more rolled segments than if the rolled segments had a greater circumferential length than the casted segments.

The one or more rolled segments may be formed of a harder material than the one or more casted segments. A harder material provides a stiffer segment, which is desirable. The casting process requires slightly softer materials in order to achieve the desired shape, and so it is further advantageous to maximise the proportion of the pitch ring formed by rolled components in order to maximise the strength of the pitch ring.

In preferred embodiments, a radial width of the one or more rolled segments is less than a radial width of an arc-shaped section of the one or more casted segments. Each segment must be wide enough in the radial direction to ensure that the segmented pitch ring maintains sufficient rigidity and is not too flexible. Segmented pitch rings of ever increasing diameter necessitate increasing this radial width to maintain rigidity, which can increase material costs and weight. A segment manufactured by rolling can be narrower than a segment manufactured by casting, while still providing sufficient stiffness. Hence it is advantageous for the rolled segments to be narrower than the casted segments in order to reduce material costs and weight.

The segmented pitch ring may comprise a bridge element spanning an interface between a rolled segment and a casted segment. Segments manufactured by different processes may result in a non-uniform stiffness at a junction/interface between these segments. This can result in a weak point of the pitch ring that is susceptible to deformation under high stress. The bridge element is therefore configured to provide a substantially uniform stiffness across the interface.

The bridge element may be located within a recess defined by adjacent stepped end portions of the rolled and casted segments. The bridge element may therefore advantageously lie flush with the surface of the pitch ring. This ensures that the outer circular circumference of the segmented pitch ring is of substantially uniform thickness. This is advantageous from a structural perspective, where the uniform thickness guards against the development of further weak points. This is advantageous also with regard to the assembly of the wind turbine in that a segmented pitch ring of substantially uniform thickness may bear against the blade root and bearing ring around the entire circumference when the pitch ring is positioned between them, without gaps forming that may cause further structural issues.

The bridge element may be formed from a material having a higher strength than the material used to form the one or more rolled segments. This ensures that high stresses experienced by one of the rolled segments do not result in deformation of the bridge element across the junction between segments.

Optionally, the one or more casted segments define mounting portions for a pitch drive mechanism. The relatively complex shape of such mounting portions is more suitable to be formed by casting, and so this contributes to the ease of manufacture of the pitch ring. The inclusion of the mounting portions facilitates connection of the pitch drive mechanism to the pitch ring.

The segmented pitch ring may comprise first and second substantially identical and diametrically opposed casted segments and first and second substantially identical and diametrically opposed rolled segments. This provides a symmetry between opposing sides of the pitch ring, reducing the risk of weak points around the circumference. This also minimises the amount of segments needed so that the more complex-shaped parts of the pitch ring are casted but the remainder of the pitch ring is formed by a rolling process. In the case where the casted segments include mounting portions for receiving a pitch drive mechanism, the symmetrical arrangement ensures that the stresses involved in pitching the blade are evenly distributed around the pitch ring.

The segmented pitch ring may comprise a beam connected between first and second diametrically opposed casted segments. Such a beam further increases the structural integrity of the pitch ring. The beam is preferably a hollow, elongate member. The beam preferably has a substantially uniform cross-section. The beam may be highly stressed in use. Advantageously, the beam may be formed by a hot-rolling process. By 'hot rolling' is meant that the manufacturing process takes place above the recrystallization temperature of the material to be rolled. The resulting crystalline structure of the hot-rolled beam has found to be optimal since it allows the beam to twist slightly and adopt highly stressed configurations without breaking or deforming.

The beam may be provided with a cut-out at each end to allow the ends to receive mounting portions of the casted segments. The cut-outs preferably each have a curved end, which is advantageous because it reduces stress concentrations in the beam and prevents cracks forming in the beam in use. The beam may comprise a cable holder for routing a cable through the beam, inside or outside. The cable holder may be connected to the body of the beam via a magnet. This advantageously avoids the need for providing holes in highly stressed portions of the beam.

The segmented pitch ring is preferably configured for mounting directly or indirectly to an inner or outer bearing ring of a pitch bearing and/or is configured for mounting directly or indirectly to a wind turbine blade or a hub. In particular, each segment may be mounted separately to the bearing ring and/or blade or hub to assist the assembly process. The segments may be mounted using the same connectors, e.g. bolts, that are used to mount the bearing ring to the blade or hub, thus minimising the number of components needed. Accordingly, the rolled and casted segments are preferably provided with a plurality of circumferential holes corresponding to circumferential holes in the bearing ring and/or blade or hub to which the pitch ring is to be mounted.

According to another aspect of the present invention, there is provided a wind turbine having a pitch system comprising the segmented pitch ring described above.

The invention also provides a method of making the segmented pitch ring described above. In particular, the method comprises manufacturing the one or more rolled segments using a rolling process and manufacturing the one or more casted segments using a casting process.

The rolling process may be a cold-rolling process. In particular, this may be performed manually to maximise the precision of the segments.

The method may comprise providing one or more bridge elements for spanning interfaces between rolled and casted segments.

In addition, or alternatively, the method may comprise manufacturing a beam for connection between first and second diametrically opposed casted segments. The method preferably comprises forming the beam using a hot-rolling process.

The method may comprise mounting the segmented pitch ring directly or indirectly to an inner or outer bearing ring of a pitch bearing and/or directly or indirectly to a wind turbine blade or a hub. The method may include mounting each segment separately.

Optional features described above in the context of the invention when expressed in terms of an apparatus are equally applicable to the invention when expressed in terms of a method, and vice versa. Repetition of such features is generally avoided for reasons of conciseness.

Figure 2:
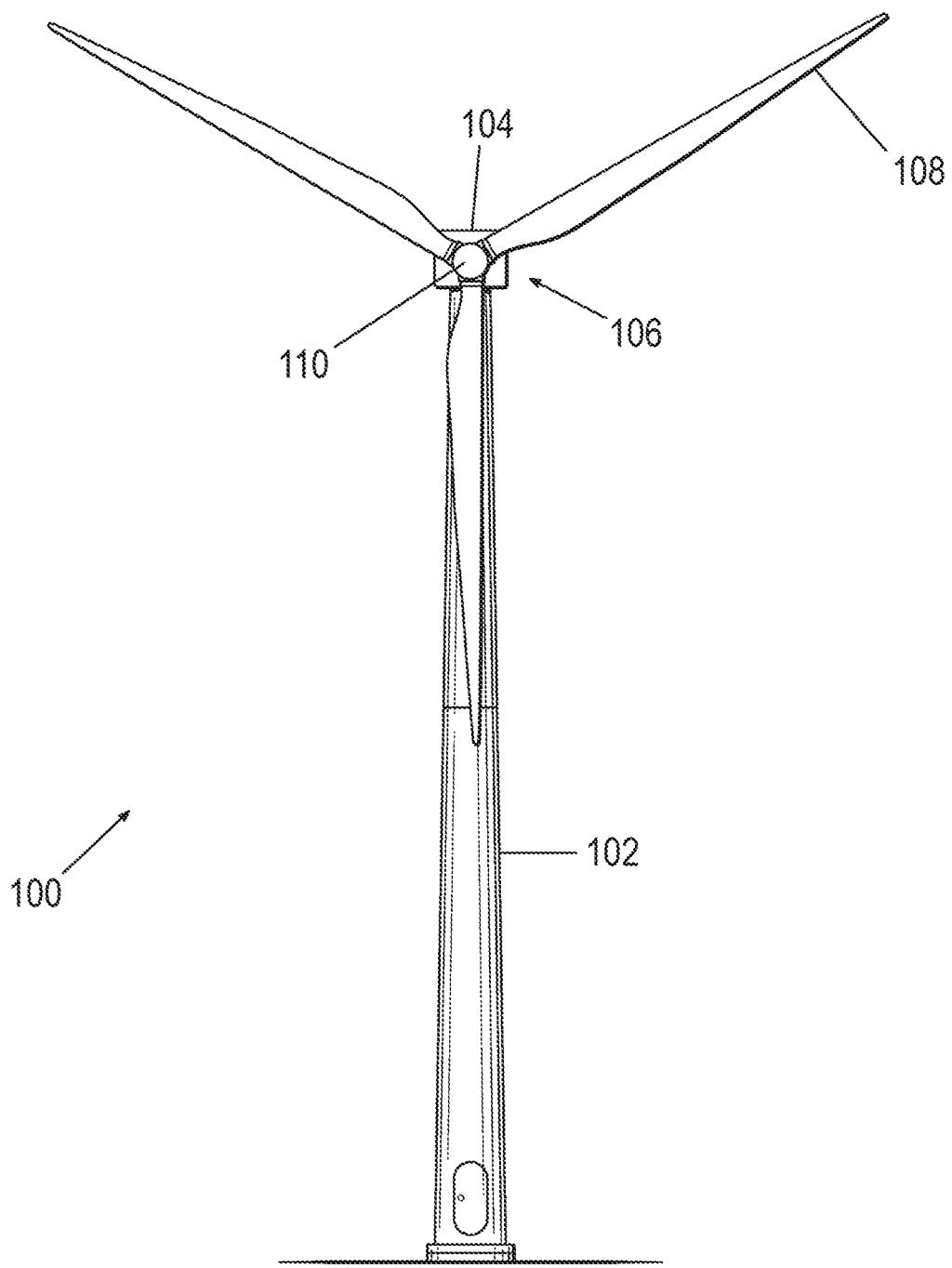
Figure 3A:
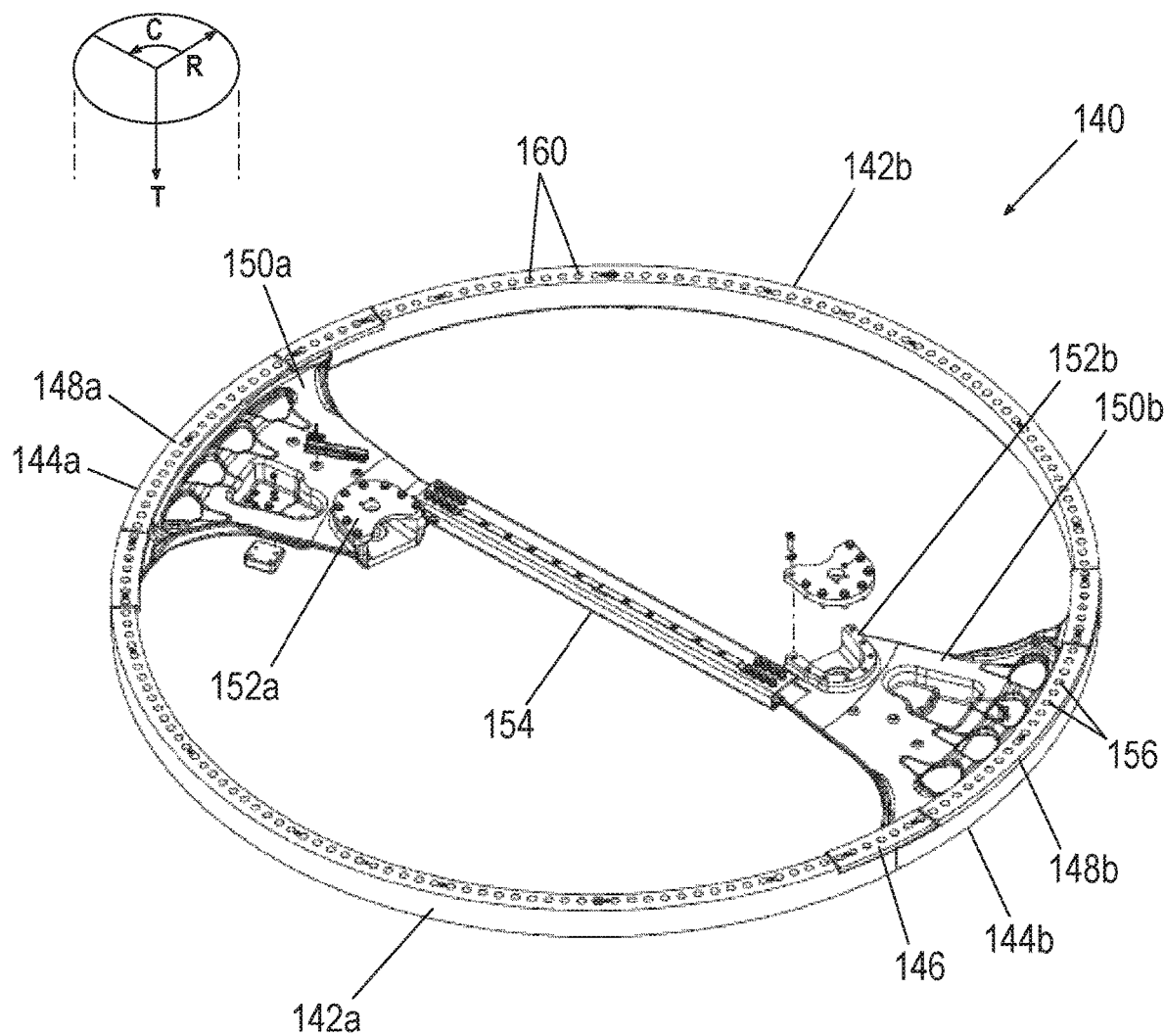
Figure 3B:
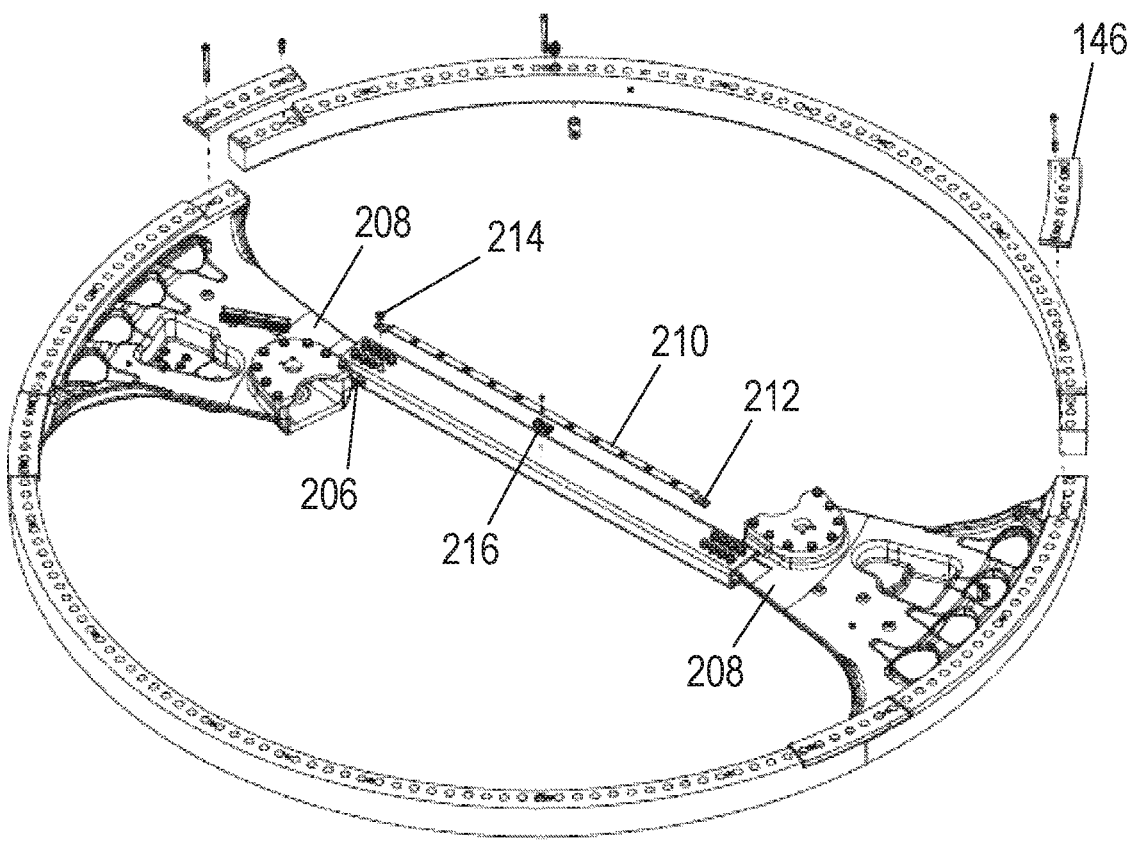
Figure 3C:
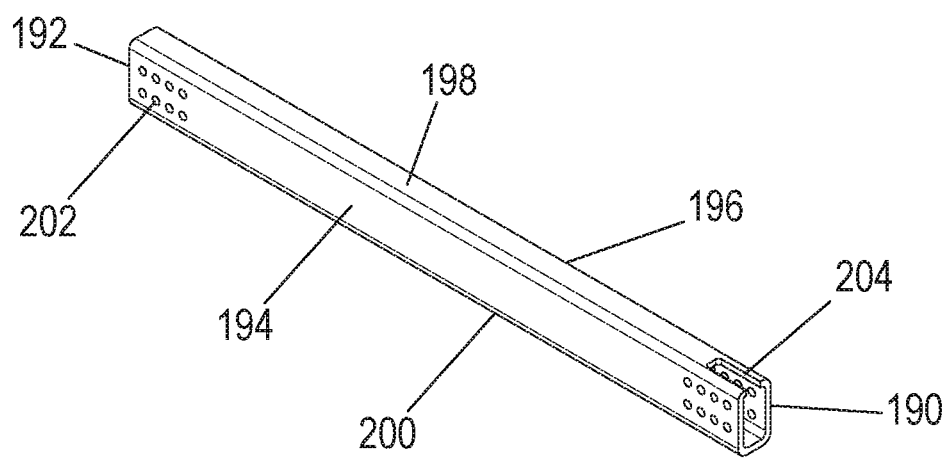
Figure 4:
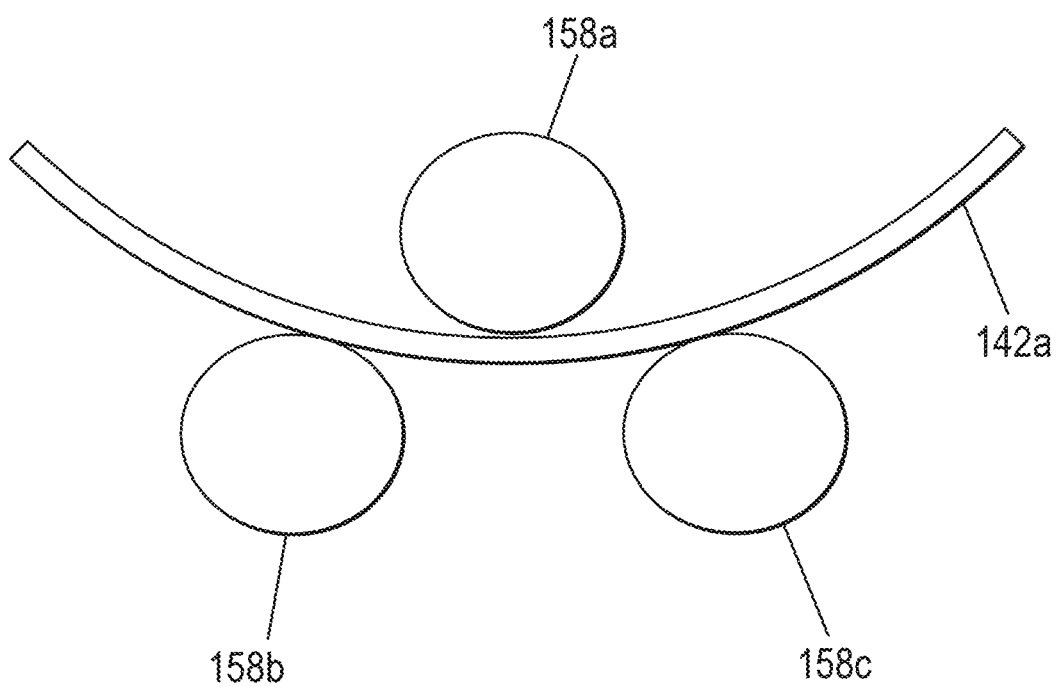
Figure 5:
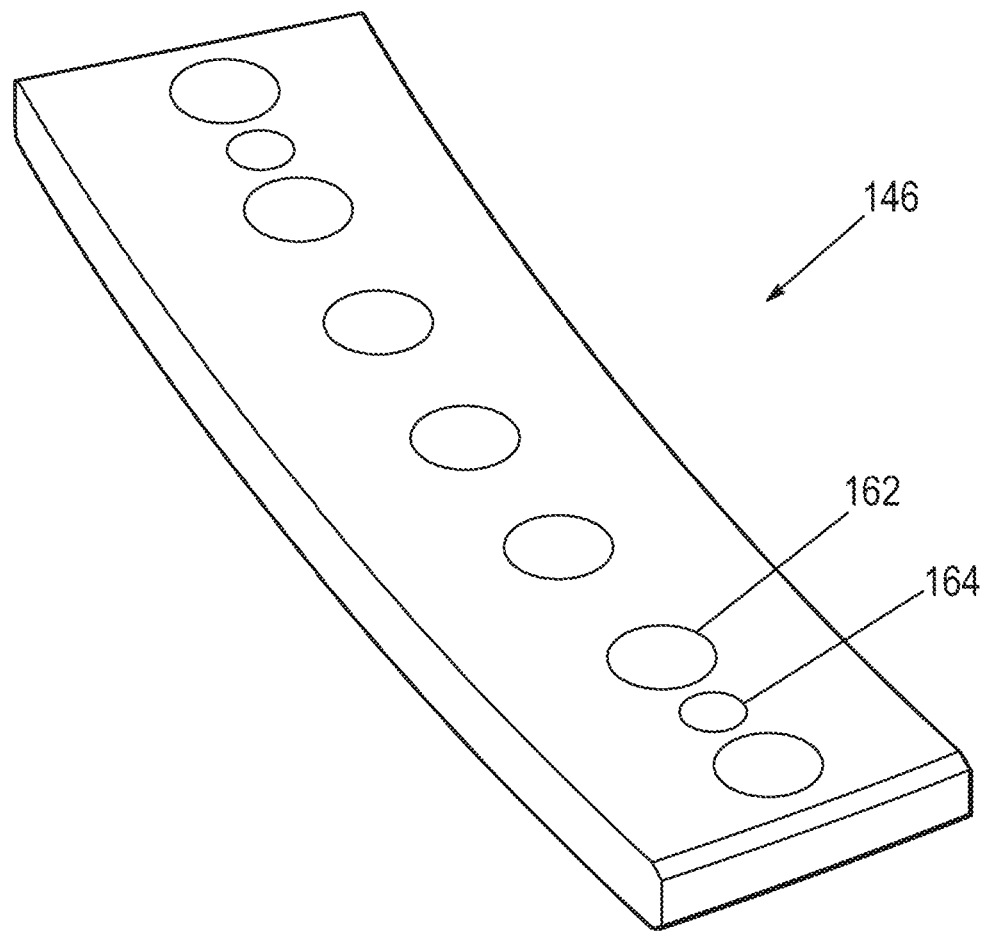
Figure 6:
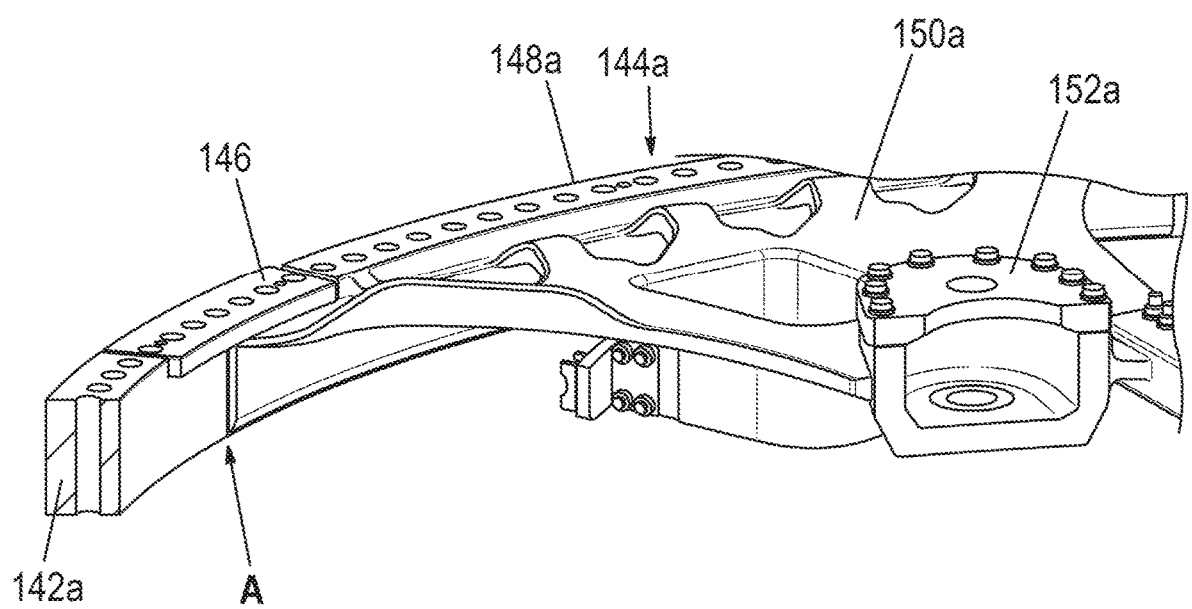
Figure 7:
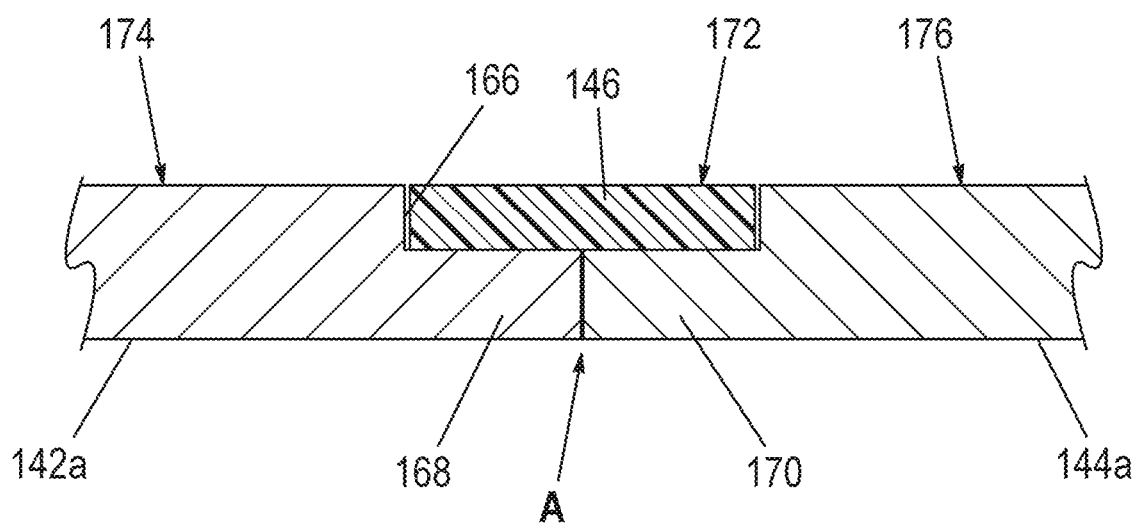

In order that the present invention may be more readily understood, embodiments of the invention will now be described, by way of non-limiting example, with reference to the remaining figures, in which:

FIG. 2 is a front view of a wind turbine according to the present invention including three blades attached to a central hub via respective pitch systems;

FIG. 3a is a segmented pitch ring according to an embodiment of the present invention including rolled and casted segments and bridge elements between the segments;

FIG. 3b is an exploded view of the pitch ring of FIG. 3a;

FIG. 3c shows a beam of the pitch ring of FIGS. 3a and 3b;

FIG. 4 shows one embodiment of an arrangement of rollers for manufacturing one of the rolled segments of the pitch ring of FIG. 3a by a rolling process;

FIG. 5 is a perspective view of one of the bridge elements of FIG. 3a;

FIG. 6 is a view of the pitch ring of FIG. 3a at a junction between a rolled segment and a casted segment; and FIG. 7 shows a schematic side view of the junction of FIG. 6.

DETAILED DESCRIPTION

FIG. 2 is a front view of a wind turbine 100 according to the present invention. The wind turbine 100 comprises a tower 102, a nacelle 104 located at the top of the tower 102, and a rotor-hub assembly 106 mounted to the nacelle 104. The rotor-hub assembly 106 comprises three turbine blades 108 affixed to a central hub 110. The blades 108 are arranged to cause rotation of the rotor-hub assembly 106 when wind is incident on the blades 108 in a direction substantially perpendicular to and into the plane of the page. The central hub 110 is connected to a main shaft housed in the nacelle 104, which in turn is connected to a generator also in the nacelle 104. The central hub 110 causes the main shaft to turn and this rotational energy is converted into electricity by the generator.

Figure 1:
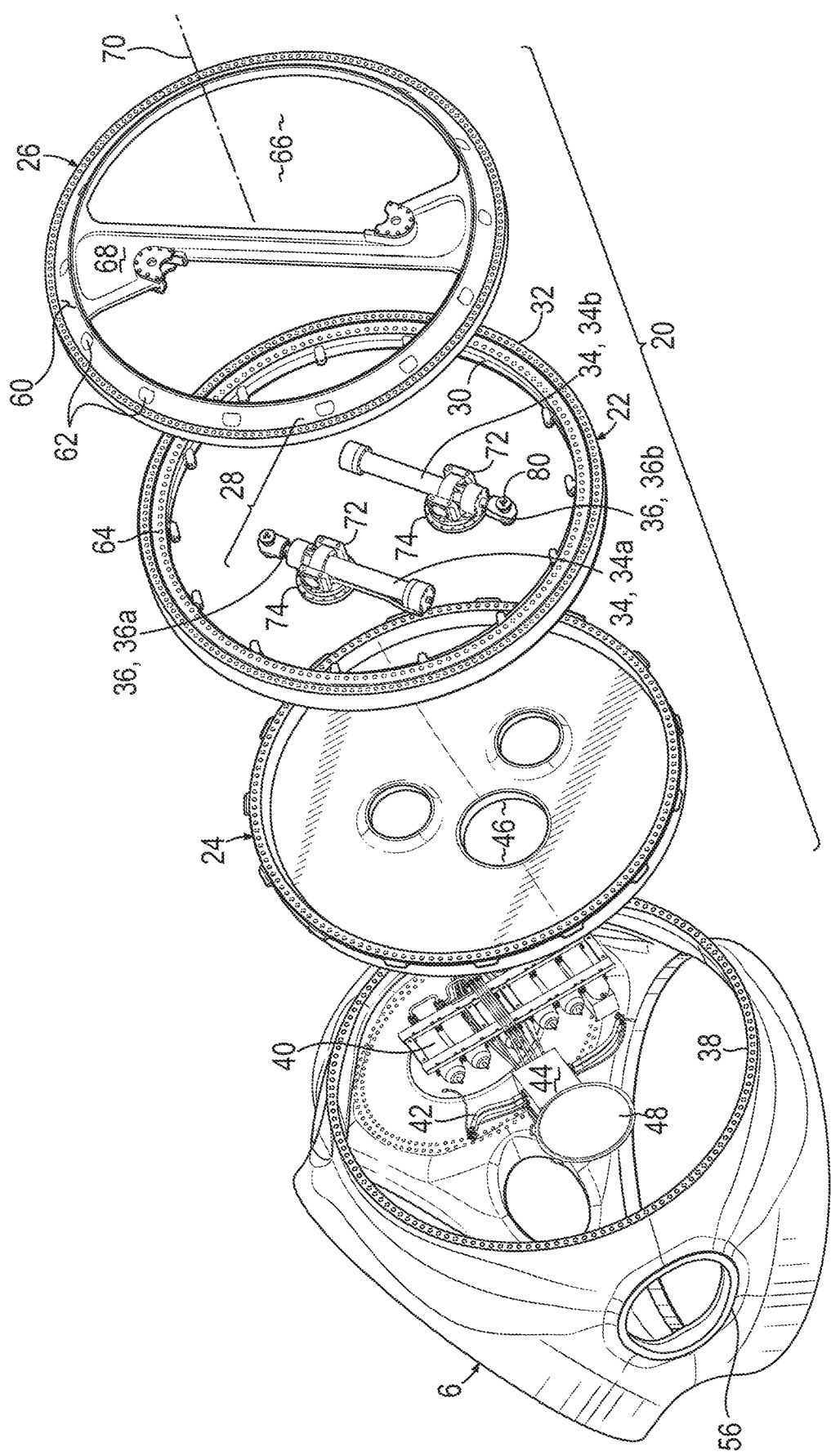
FIG. 1 has already been described by way of background, and shows an exploded perspective view of a prior art pitch system for a wind turbine.

Each wind turbine blade 108 is mounted to the central hub 6 by a pitch system similar to the pitch system described by way of background with reference to FIG. 1. Accordingly, reference to FIG. 1 should be made for the general structure of the pitch system. Further details of the pitch system can be found in WO 2012/069062, the content of which is hereby incorporated by reference. However, in contrast to the prior art pitch system, the pitch system of the present invention comprises one or more segmented pitch rings in place of one or more of the casted components of the prior art pitch system.

FIG. 3a shows a segmented pitch ring 140 according to an embodiment of the present invention. It will be appreciated that the segmented pitch ring 140 provides an alternative to the coupling member 26 of the pitch system shown in FIG. 1.

Referring to FIG. 3a, the segmented pitch ring 140 is substantially circular and formed of four segments, comprising two rolled segments 142a, 142b that are manufactured by a rolling process, and two casted segments 144a, 144b that are manufactured by a casting process. As shown in FIG. 3a, the rolled and casted segments 142a, 142b and 144a, 144b each form a circumferential portion of the pitch ring 140. The rolled segments 142a, 142b are arranged alternately with the casted segments 144a, 144b about the circumference of the pitch ring 140, such that each rolled segment 142a, 142b is located between the casted segments 144a, 144b. In the present embodiment, the two rolled segments 142a, 142b are substantially identical and the two casted segments 144a, 144b are substantially identical. The respective rolled segments 142a, 142b are therefore diametrically opposed, and likewise the respective casted segments 144a, 144b are diametrically opposed.

The diameter of the pitch ring 140 in this example is approximately 4.5 metres, but the pitch ring 140 may be any suitable diameter. The segmented form of the pitch ring 140 facilitates economical manufacture of pitch rings of any suitable size, including pitch rings of very large diameters in excess of 4.5 metres.

The pitch ring 140 also includes four bridge elements 146 in the form of substantially-flat arc-shaped plates that bridge the rolled and casted segments 142a, 142b, 144a, 144b, and will be discussed in more detail later.

Each casted segment 144a, 144b includes an arcuate section 148a, 148b (i.e. an arc-shaped section), which forms part of the circumference of the pitch ring 140, and a connector section 150a, 150b that extends generally radially inwards from each arcuate section 148a, 148b. The arcuate sections 148a, 148b are of substantially uniform width in a radial direction, i.e. in the direction indicated by R in FIG. 3a. The connector sections 150a, 150b define mounting points for a pitch drive mechanism. Specifically, in this example, each connector section 150a, 150b includes a receiver section 152a, 152b configured to receive a drive member, e.g. a hydraulic actuator, of the pitch system.

The connector sections 150a, 150b of the opposed casted segments 144a, 144b are connected to each other by a steel 'cross-bar' 154, also referred to as a 'beam' 154. The beam 154 provides additional strength to the pitch system structure by guarding against deformation of the pitch ring 140 and/or the pitch bearing, and will be described in further detail later.

Each casted segment 144a, 144b further includes a plurality of holes 156 spaced equally in a circumferential direction along the circumferential length of its arcuate section 148a, 148b. The circumferential direction is generally indicated by C in FIG. 3a. Each hole 156 extends in a longitudinal direction through the thickness of the casted segment 144a, 144b, i.e. in the direction generally indicated by T in FIG. 3a. The longitudinal direction is generally parallel to a longitudinal axis of the blade when the pitch ring 140 is installed in the wind turbine 100. The holes 156 are for receiving mounting means such as bolts to mount the casted segments 144a, 144b to the blade 108 and/or to a blade pitch bearing ring (e.g. the outer bearing ring 32 in FIG. 1). Specifically, the holes 156 are aligned with corresponding holes in the root end of the blade 108 and/or with corresponding holes in a bearing ring to allow mounting to take place. The holes 156 are formed in the segments 144a, 144b during the casting process.

Manufacturing the segments 144a, 144b by a casting process is preferable over, for example, a welding process. This is because the casted parts have been found to be less prone to fatigue and to be easier to make. It is also easier to fulfill certain requirements of the segments, such as inserting the holes 156 and pitch drive mounting features using a casting process.

The rolled segments 142a, 142b are arc-shaped, and of substantially uniform width in the radial direction, i.e. in the direction indicated by R in FIG. 3a. Like the casted segments 144a, 144b, each rolled segment 142a, 142b includes a plurality of holes 160 spaced equally in the circumferential direction C along its circumferential length to facilitate mounting to the blade and/or to the blade pitch bearing ring (e.g. the outer bearing ring 32 in FIG. 1). The holes 160 are inserted or drilled into the segments 142a, 142b after the sheet has been rolled into the desired shape.

The radial width of the rolled segments 142a, 142b (i.e. the width in the radial direction R) is slightly less than the corresponding radial width of the arcuate sections 148a, 148b of the casted segments 144a, 144b. This is because the rolling process allows harder steel to be used than a casting process, and hence rolled segments can be made with reduced width (and hence reduced material costs) in comparison with a casted segment whilst still providing sufficient stiffness. Specifically, in this example the width in the R direction of each rolled segment 142a, 142b is approximately 118 millimetres and the width in the R direction of each casted segment 144a, 144b is approximately 125 millimetres.

It is therefore advantageous from a cost perspective for the rolled segments 142a, 142b to form a greater proportion of the circumference of the pitch ring 140 than the casted segments 144a, 144b. Accordingly, in this example, the circumferential length of each rolled segment 142a, 142b is greater than the circumferential length of the arcuate sections 148a, 148b of the casted segments 144a, 144b. Specifically, in this example each rolled segment 142a, 142b spans approximately 130° of the circumference of the pitch ring 140 and each casted segment 144a, 144b spans approximately 50° of the circumference of the pitch ring 140. Note that the thickness of each rolled segment 142a, 142b in the T direction is substantially equal to that of each casted segment 144a, 144b. Specifically, the thickness of each of the segments 142a, 142b, 144a, 144b is approximately 166 millimetres.

Rolling is a generally well-known manufacturing process, although it has not previously been considered for forming components of pitch systems for wind turbines. Accordingly, a brief discussion of the process is provided below, which will be familiar to persons skilled in the art of rolling.

Each rolled segment 142a, 142b of the pitch ring 140 is formed from a square or rectangular sheet of steel. The sheet is passed back and forth through a series of different types of rollers in order to achieve the desired shape and dimensions. For example, as is shown in the schematic diagram of FIG. 4, the arcuate shape of the segments 142a may be achieved by a set of three rollers 158a, 158b, 158c, one above and two below the sheet, with the first of the rollers 158a being positioned generally centrally above the other two rollers 158b, 158c. In the present embodiment, the rolling process is performed manually as this affords a higher degree of control over the shaping of the segment, and leads generally to less deformation.

The rolled segments 142a, 142b are manufactured by so-called 'cold rolling', meaning that the manufacturing process occurs generally at around room temperature, but more specifically below the recrystallization temperature of the metal. This advantageously provides a segment 142a, 142b of greater strength than one manufactured at higher temperatures. The substantially uniform cross section of the segments 142a, 142b make these segments suitable for being manufactured by rolling, while providing greater strength than an equivalent casted segment.

As the segments 144a, 144b are of a more complex shape, including both an arcuate part and a connection part, these segments have been found to be more suitable for being formed by casting than by rolling.

Referring again to FIG. 3a, it has already been mentioned briefly above that bridge elements 146 are provided between the rolled and casted segments 142a, 142b and 144a, 144b. Each bridge element 146 spans an interface between a rolled segment 142a, 142b and a casted segment 144a, 144b. The bridge elements 146 can be seen more clearly in the exploded view of FIG. 3b. The form and function of the bridge elements 146 will now be described in further detail with reference to FIGS. 5 to 7.

Referring to FIG. 5, this shows one of the bridge elements 146 in isolation. The bridge element 146 is arc-shaped and of generally rectangular cross section. The bridge element has a radius of curvature corresponding substantially to that of the rolled and casted segments 142a, 142b and 144a, 144b (FIG. 3a) in order to match the curvature of the rolled and casted segments 142a, 142b, 144a, 144b. The bridge element 146 is of substantially uniform thickness in the longitudinal direction (i.e. the T direction—see FIG. 3a) and of substantially uniform width in the radial direction (i.e. the R direction—see FIG. 3a). In particular, the radial width of each bridge element 146 is slightly greater than that of each casted segment 144a, 144b. Specifically, in this example the radial width of each bridge element 146 is approximately 135 millimetres. Also, the thickness in the T direction of each bridge element 146 is approximately 30 millimetres.

The bridge element 146 includes a plurality of holes 162 for connecting it to the rolled and casted segments 142a, 142b, 144a, 144b using the same bolts and holes 156, 160 used to mount the pitch ring 140 to the blade 108 and the blade pitch bearing ring. The bridge element 146 in this embodiment has an arcuate length corresponding to seven circumferential holes 162 of the pitch ring 140. This length of the bridge element 146 has been found to be optimal for providing uniform stiffness across the interface between the rolled and casted segments 142a, 142b and 144a, 144b of the pitch ring 140. The bridge element 146 is additionally attached to the rolled and casted segments 142a, 142b and 144a, 144b by screws or bolts inserted through further holes 164.

FIG. 6 shows a close-up view of a part of the pitch ring 140 of FIG. 3a, in particular showing the connection between the bridge element 146, rolled segment 142a and casted segment 144a. It is seen generally at arrow A, which indicates the interface between the rolled segment 142a and casted segment 144a, that the radial width of the arcuate section 148a of the casted segment 144a is slightly greater than the radial width of the rolled segment 142a. As mentioned previously, this is because the casted arcuate section 148a is manufactured from softer steel than that of the rolled segment 142a, and so a greater width of the arcuate section 148a is used to satisfy strength requirements. Softer steel is used because of restrictions of the different manufacturing techniques.

In this embodiment, the casted segments 144a, 144b are formed of a highly ductile material and, specifically, in this example, of spherical cast iron with a yield strength of approximately 220 megapascals and an elastic modulus of approximately 170 kilo Newtons per square millimetre. In contrast, the rolled segments 142a, 142b are formed of steel with, in this example, a yield strength of approximately 355 megapascals and an elastic modulus of approximately 210 kilo Newtons per square millimetre.

As the casted arcuate section 148a and rolled segment 142a are formed by different techniques and of different materials, there may be a difference in stiffness at the interface A. This can be problematic because a unified stiffness across the rolled and casted segments 142a, 144a is preferred to ensure that undue stresses are not placed on the mounting bolts, which would reduce their lifespan. For example, the lifespan of the mounting bolts may be expected to be around 25 years. A stiffness differential across the interface A may also adversely affect the bearing rings of the pitch bearing leading to uneven wearing of the pitch bearing, which is also undesirable.

The purpose of the bridge element 146 is, therefore, to ensure that there is a substantially uniform stiffness across the interface A between the rolled and casted segments 142a, 144a. Accordingly, the primary purpose of the bridge element 146 is to contribute to the structural integrity of the pitch ring 140 rather than to connect the segments 142a, 144a to each other. Therefore, in order to perform its function successfully, the bridge element 146 has a higher strength requirement than the segments 142a, 144a, and so is formed of high strength, high quality steel. In addition, as mentioned above, its width in the radial direction (or R direction) is greater than that of the arcuate section 148a because of its higher strength requirements. Specifically, in this example the bridge element 146 is formed of high grade steel with a yield strength of approximately 690 megapascals and an elastic modulus of approximately 210 kilo Newtons per square millimetre.

FIG. 7 shows a schematic cross-sectional view of the rolled segment 142a, casted segment 144a, and bridge element 146 at the interface A indicated in FIG. 6. It can be seen in FIG. 7 that the bridge element 146 fits within a recess 166 defined by stepped end portions 168, 170 of the respective rolled and casted segments 142a, 144a. The stepped end portions 168, 170 are suitably dimensioned such that an upper surface 172 of the bridge element 146 lies substantially flush with an upper surface 174 of the rolled segment 142a and an upper surface 176 of the casted segment 144a. The term 'upper' is used for convenience to refer to the orientation of the respective surfaces as illustrated in FIG. 7.

Although appearing connected together in FIG. 3a, it is preferred that each of the rolled and casted segments 142a, 142b, 144a, 144b will be mounted individually to the blade 108 and/or blade pitch bearing using bolts through the holes 156, 60, before the bridge element 146 is then connected to the segments 142a, 142b, 144a, 144b using screws and the holes 164. Since the various segments are heavy, this facilitates assembly of the pitch system.

It has already been mentioned above that the casted segments 144a, 144b are connected together by the beam 154. The beam 154 will now be described in further detail with reference to FIG. 3c. Referring to FIG. 3c, the beam 154 is a hollow elongate component. The beam 154 has a substantially constant cross-section along its length. In this embodiment, the beam 154 is of substantially rectangular cross-section. The beam 154 extends between first and second end portions 190, 192, and comprises first and second mutually opposed side surfaces 194, 196 connected by first and second mutually opposed edge surfaces 198, 200. Each end portion of the beam 154 is provided with a plurality of holes 202. Specifically, the first and second side surfaces 194, 196 each include eight holes at the respective first and second end portions 190, 192 of the beam 154. Accordingly, the beam 154 in this embodiment includes thirty two holes in total. The holes 202 in the first side surface 194 are aligned with, i.e. located opposite, the holes 202 in the second side surface 196.

The first and second end portions 190, 192 of the beam 154 are also provided with a respective cut-out 204, 206. Specifically, in this embodiment, a first cut-out 204 is provided in the first edge surface 198 at the first end of the beam 190, and a second cut-out 206 is provided in the second edge surface 200 at the second end of the beam 192. The second cut-out 206 is not visible in FIG. 3c, but can be seen for example in FIG. 3b. The cut-outs 204, 206 are substantially U-shaped, and comprise a curved end. As the beam 154 is highly stressed in use, the curved ends of the cut-outs 204, 206 advantageously avoid stress concentrations in the beam 154 and hence prevent cracks from developing in the beam 154.

As shown in FIG. 3b, the connector sections 150a, 150b of the opposed casted segments 144a, 144b of the pitch ring 140 include mounting portions 208 for the beam. The cut-outs 204, 206 in the beam 154 allow these mounting portions 208 to be inserted between the first and second side surfaces 194, 196 of the beam 154. The mounting portions 208 are each provided with a set of eight holes (not visible in the figures) corresponding to the holes 202 at the respective ends 190, 192 of the beam 154. The beam 154 is connected to the connector sections 150a, 150b by sixteen bolts that extend through the holes 202 in the respective end portions 190, 192 of the beam 154 and through the corresponding holes in the mounting portions 208.

The beam 154 is made from steel and is formed by rolling. As the beam 154 is highly stressed in use, it must be able to twist without breaking. A hot rolling process has been found to be optimal for forming the beam 154. A hot rolling process involves heating the steel to a temperature above its recrystallization temperature and shaping the steel at temperatures high enough to allow the metal crystals to reform to their normal shape after shaping. The resulting crystalline structure of the hot-rolled beam allows the beam to be highly stressed in use without breaking or deforming.

Referring to FIG. 3b, in this embodiment a cable holder 210 is mounted to the first surface 194 of the beam 154. The cable holder 210 allows cables to be routed across the pitch ring 140. The cable holder 210 is a thin elongate member provided with a hole 212 at each end. The cable holder 210 is secured at each end to the beam 154 by a bolt 214. The bolt 214 is one of bolts described above, which is used to connect the beam 154 to the casted segments 144a, 144b. These bolts therefore extend additionally through the provided holes 212 in the cable holder 210, as shown in FIG. 3b.

A magnet 216 is provided between a central portion of the cable holder 210 and the beam 154. The magnet 216 couples the central portion of the cable holder 210 to the beam 154. Use of a magnet 216 is particularly advantageous because it avoids the need for a hole to be provided in the central portion of the beam 154. As the beam 154 is highly stressed in use, a hole in this location may compromise the structural integrity of the beam 154 and lead to cracking or other such failure of the beam 154.

Various modifications may be made to the above embodiment without departing from the scope of the present invention as defined in the accompanying claims.

For example, in the described embodiment, the pitch ring 140 is a separate component that is to be mounted between the pitch bearing and the blade 108; however, the pitch ring 140 may instead be an integral portion of the pitch bearing or blade 108. In particular, the pitch ring 140 may be integral with the pitch bearing ring that is mounted to the blade 108.

Although the pitch ring 140 has four segments (two rolled and two casted) in the described embodiment, any number of suitable rolled segments and any number of suitable casted segments may be used.

Whilst the embodiment above represents an alternative to the coupling member 26 of the pitch system shown in FIG. 1, it should be appreciated that the invention is not limited in this respect. For example, a pitch ring comprising rolled and casted parts according to the present invention may be used in place of the first coupling member 24 shown in FIG. 1. Such a pitch ring would therefore be connected between the inner bearing ring 30 and the hub 6 shown in FIG. 1.

The invention is also not limited to use in the pitch system shown in FIG. 1, which merely provides an example of the context in which the segmented pitch ring of the present invention may be used. The pitch ring of the present invention could equally be incorporated into other pitch system arrangements. Other pitch system arrangements may instead have an inner bearing ring connected to the blade and an outer bearing ring connected to the hub, for example. The segmented pitch ring may be attached on either side of an inner or outer bearing ring. Accordingly, the segmented pitch ring does not necessarily need to be located between a bearing ring and the blade, or between a bearing ring and the hub. The segmented pitch ring can be mounted directly or indirectly to a bearing ring and/or to the blade or hub. For example, other intermediate members such as rings or plates may be provided between the pitch ring and a bearing ring and/or between the pitch ring and the hub or blade. The present invention may also be embodied in any other ring used in a wind turbine blade pitch system and is not limited to coupling members such as those shown in FIG. 1, which provide one example of the application of the present invention.

Accordingly, the embodiment described herein is provided purely for illustrative purposes and is not to be construed as limiting the scope of the invention.

The invention claimed is:

1. A segmented pitch ring for use in a blade pitch system of a wind turbine, the segmented pitch ring comprising one or more rolled segments and one or more casted segments, wherein the one or more rolled segments are not casted, and wherein the one or more casted segments are not rolled, and wherein the rolled and casted segments are arc-shaped or comprise arc-shaped sections that in combination define a substantially circular circumference of the pitch ring.

2. The segmented pitch ring of claim 1, wherein the one or more rolled segments are formed by a cold-rolling process.

3. The segmented pitch ring according to claim 1, wherein the one or more rolled segments form a greater portion of the circumference of the pitch ring than the one or more casted segments.

4. The segmented pitch ring of claim 1, wherein the one or more rolled segments have a greater circumferential length than the one or more casted segments.

5. The segmented pitch ring of claim 1, wherein the one or more rolled segments are formed of a harder material than the one or more casted segments.

6. The segmented pitch ring according to claim 1, wherein a radial width of the one or more rolled segments is less than a radial width of an arc-shaped section of the one or more casted segments.

7. The segmented pitch ring of claim 1, further comprising a bridge element spanning an interface between a rolled segment and a casted segment.

8. The segmented pitch ring of claim 7, wherein the bridge element is formed from a material having a higher strength than the material used to form the one or more rolled segments.

9. The segmented pitch ring of claim 1, wherein the one or more casted segments define mounting portions for a pitch drive mechanism.

10. The segmented pitch ring of claim 1, wherein the pitch ring comprises a plurality of rolled segments and a plurality of casted segments, and wherein the rolled segments are arranged alternately with the casted segments to define the circumference of the pitch ring.

11. The segmented pitch ring of claim 1, further comprising a beam connected between first and second diametrically opposed casted segments.

12. The segmented pitch ring of claim 11, wherein the beam is formed by a hot-rolling process.

13. The segmented pitch ring of claim 1, wherein the pitch ring comprises first and second substantially identical and diametrically opposed casted segments and first and second substantially identical and diametrically opposed rolled segments.

14. A wind turbine having a pitch system comprising the segmented pitch ring of claim 1.

15. A method of making the segmented pitch ring of claim 1, the method comprising: manufacturing the one or more rolled segments using a rolling process and manufacturing the one or more casted segments using a casting process.

16. A segmented pitch ring for use in a blade pitch system of a wind turbine, the segmented pitch ring comprising at least one rolled segment and at least one casted segment, wherein the one or more rolled segments are not casted, and wherein the one or more casted segments are not rolled, and wherein the at least one rolled segment is different from the at least one casted segment in shape, material, or material property.

* * * * *